(12) United States Patent
Lu et al.

(10) Patent No.: US 9,659,407 B2
(45) Date of Patent: May 23, 2017

(54) PREEMPTIVE FLUSHING OF SPATIAL SELECTIVE BINS FOR DEFERRED GRAPHICS PROCESSING

(71) Applicant: MediaTek Singapore Pte. Ltd., Singapore (SG)

(72) Inventors: Chien-Ping Lu, Cupertino, CA (US); Qun-Feng Liao, San Jose, CA (US); Hsilin Huang, Cupertino, CA (US); Xiayang Zhao, San Jose, CA (US)

(73) Assignee: MediaTek Singapore, Pte. Lte., Singapore (SG)

( * ) Notice: Subject to any disclaimer, the term of this patent is extended or adjusted under 35 U.S.C. 154(b) by 178 days.

(21) Appl. No.: 14/605,068

(22) Filed: Jan. 26, 2015

(65) Prior Publication Data
US 2016/0217550 A1    Jul. 28, 2016

(51) Int. Cl.
*G06T 17/00* (2006.01)
*G06T 17/10* (2006.01)
*G06T 1/20* (2006.01)
*G06T 15/00* (2011.01)

(52) U.S. Cl.
CPC .............. *G06T 17/10* (2013.01); *G06T 1/20* (2013.01); *G06T 15/005* (2013.01)

(58) Field of Classification Search
None
See application file for complete search history.

(56) References Cited

U.S. PATENT DOCUMENTS

| | | | |
|---|---|---|---|
| 6,657,635 B1 | 12/2003 | Hutchins | |
| 6,697,063 B1* | 2/2004 | Zhu | G06T 15/005 345/421 |
| 7,102,646 B1* | 9/2006 | Rubinstein | G06T 15/005 345/543 |
| 7,505,036 B1* | 3/2009 | Baldwin | G06T 15/503 345/419 |
| 8,605,102 B1* | 12/2013 | Purcell | G06T 15/005 345/530 |
| 8,780,123 B2* | 7/2014 | Crow | G06F 9/4812 345/506 |
| 8,817,026 B1* | 8/2014 | Zimmerman | G06T 1/60 345/426 |
| 2004/0119710 A1* | 6/2004 | Piazza | G06T 15/405 345/422 |
| 2007/0103474 A1* | 5/2007 | Huang | G06T 1/20 345/506 |
| 2011/0102440 A1* | 5/2011 | Yuen | G06T 15/005 345/428 |

(Continued)

*Primary Examiner* — Anh-Tuan V Nguyen
(74) *Attorney, Agent, or Firm* — The Law Office of Tong Lee

(57) ABSTRACT

A graphics processing unit (GPU) is provided to preemptively flush one or more bins. The GPU generates bin data of a display area according to an association of primitive data with the bins that correspond to the display area. Upon detecting an adaptive condition, a signal is generated to indicate that one or more bins of a first frame are to be flushed in a first order before the first frame is fully binned. The signal interrupts bin flush of a second frame in a second order in order to flush the one or more bins of the first frame in the first order. After the one or more bins of the first frame are flushed, the bin flush of the second frame is resumed in the second order.

20 Claims, 7 Drawing Sheets

(56) References Cited

U.S. PATENT DOCUMENTS

| | | | |
|---|---|---|---|
| 2011/0267346 A1 | 11/2011 | Howson | |
| 2012/0229464 A1* | 9/2012 | Fishwick | G06T 17/20 345/423 |
| 2012/0293519 A1 | 11/2012 | Ribble | |
| 2013/0194286 A1* | 8/2013 | Bourd | G06F 9/544 345/545 |
| 2014/0118364 A1* | 5/2014 | Hakura | G06T 11/40 345/505 |
| 2014/0267259 A1* | 9/2014 | Frascati | G06T 15/005 345/423 |

* cited by examiner

Preemptively Flushing Selected Bins of Frame N+1

PREEMPTIVE FLUSHING OF SPATIAL SELECTIVE BINS FOR DEFERRED GRAPHICS PROCESSING

TECHNICAL FIELD

Embodiments of the invention relate to a graphics processing system; and more specifically, to deferred graphics processing.

BACKGROUND

A graphics processing unit (GPU) processes and renders graphical objects as picture elements, or "pixels," on a display device. In computer graphics, a 3D graphical object is often represented by a combination of primitives such as points, lines, polygons, and higher order surfaces. To render a particular scene, the primitives are rasterized individually into a 2D image of pixels. Because there are often thousands, millions, or even hundred millions of primitives in a complex 3D scene, the complete rasterization of each primitive individually can result in suboptimal system performance. Conventional graphics systems suffer from repeated color and depth value reads and writes from memory as the rasterization process moves from one primitive to the next. Immediate shading of rasterized pixels causes unnecessary processing overhead and overall inefficient use of system memory bandwidth.

Deferred rendering refers to the accumulation of multiple primitives, potentially from multiple graphical objects in a scene, before these primitives are rendered in one rendering pass. One approach to deferred rendering is to divide a display space into multiple areas. The primitives accumulated from multiple graphical objects in a frame can be rendered area by area, instead of primitive by primitive, to reduce the amount of memory access. Using deferred rendering can significantly improve system performance, especially in mobile devices where power and system bandwidth are at a premium.

SUMMARY

In one embodiment, a GPU is provided. The GPU comprises a binning engine to generate bin data of a display area according to an association of primitive data with a plurality of bins that correspond to the display area. The GPU further comprises a rendering engine to render the bin data of the display area; a flush controller to generate a signal upon detecting an adaptive condition. The signal indicates one or more bins of a first frame to be flushed from a bin buffer in a first order before the first frame is fully binned. The GPU further comprises a bin controller coupled to the binning engine, the rendering engine and the flush controller to control access to the bin buffer. The bin controller, during bin flush of a second frame in a second order, is interrupted by the signal to flush the one or more bins of the first frame in the first order. The bin controller is operative to resume the bin flush of the second frame in the second order.

In another embodiment, a method of a GPU is provided. The method comprises the step of generating bin data of a display area according to an association of primitive data with a plurality of bins that correspond to the display area. The method further comprises the steps of generating, upon detecting an adaptive condition, a signal indicating that one or more bins of a first frame are to be flushed in a first order before the first frame is fully binned, wherein the signal interrupts bin flush of a second frame in a second order; flushing the one or more bins of the first frame in the first order; and resuming the bin flush of the second frame in the second order.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
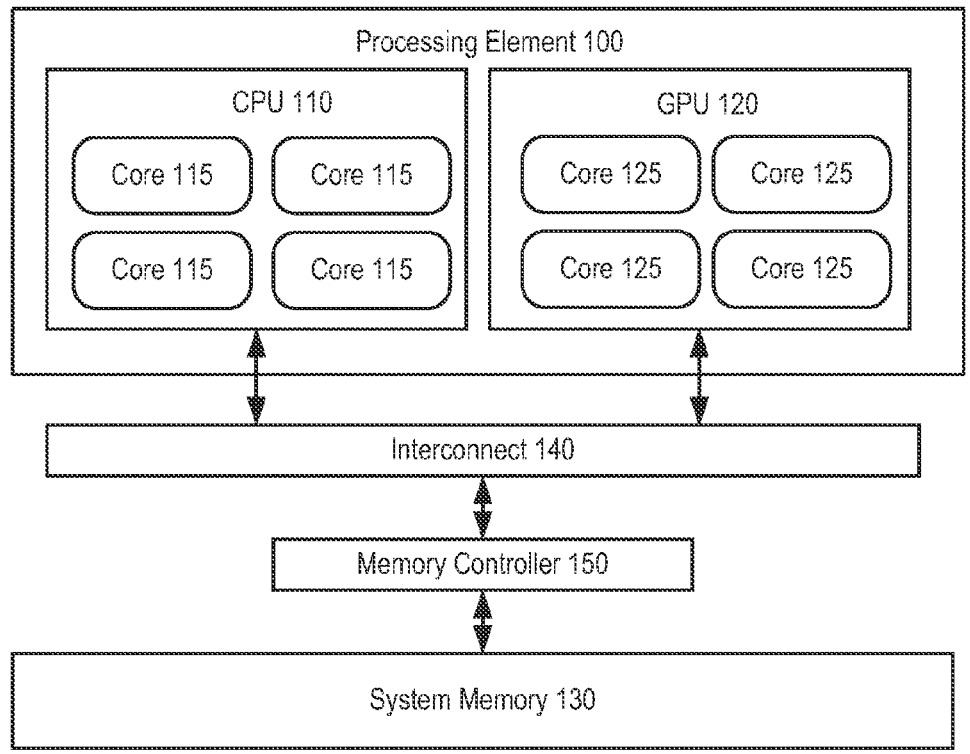
FIG. 1 illustrates a system according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Limited memory bandwidth has been a major obstacle in improving the performance of traditional 3D graphics pipelines. As described before, deferred rendering can reduce the demand on memory bandwidth in 3D graphics pipelines. One approach to deferred rendering includes two passes. The first pass is the binning pass, in which primitives of a frame are sorted into (or equivalently "associated with") a set of bins. The bins contain bin data to be rendered in the display space. The display space is the space or area in which a sequence of frames is to be rendered. The display space is segmented into a regular grid of bin areas (e.g., 32 pixels×32 pixels or other suitable sizes), with each bin area displaying the rendered bin data of a corresponding bin.

The second pass is the rendering pass, in which the bin data is rendered bin by bin. By rendering one bin of data at a time, the primitive data of multiple graphical objects that falls into the same bin can be processed in the same pass with efficient data access. Thus, in general, deferred rendering can improve system performance.

Conventionally, the bin data is temporarily stored in a memory before being processed for rendering. In some systems, the memory is a dynamic random-access memory (DRAM) attached to the GPU. In some systems the DRAM can be shared by the GPU and the CPU. A portion of the memory can be designated for storing the bin data. However, in some conventional systems, this designated portion of memory may reach its full capacity in the middle of binning a frame, and the whole frame is flushed into the rendering hardware to start immediate rendering. Whole frame flushing is costly as it forfeits the benefit of defer rendering with respect to memory I/O saving. That is, the unbinned primitives that are flushed as a result of whole frame flushing will be processed for rendering primitive by primitive, instead of bin by bin. Thus, memory I/O overhead will increase and system performance will degrade significantly.

Conventional GPU systems may also suffer from uneven workload distribution for the rendering hardware. From time to time the rendering hardware may be stalled due to insufficient bin data fed from the binning hardware. For example, when the primitives of a frame are concentrated in a few bins, it may take a long period of time for the binning hardware to complete a bin and output the bin data of that bin to the rendering hardware. During that time period, the rendering hardware may be stalled or under-utilized. One scenario that incurs highly concentrated bins is tessellation. When a graphical object is tessellated, the graphical object is represented by many small primitives that are often clustered in concentrated bins. In conventional systems, these highly concentrated bins not only cause temporal workload imbalance, but may also take up so much memory capacity that in turn causes whole frame flushing which degrades system performance.

According to embodiments of the invention, a system and method is provided to enable preemptive flushing of one or more bins of a frame upon detecting one or more adaptive conditions. The flush is preemptive because the flush occurs before the frame is fully binned and during the normal flush process of another frame. The preemptive flush prevents memory overflow as selected bins can be flushed before the memory reaches its full capacity. The preemptive flush also alleviates uneven workload distribution as heavily-loaded bins can be flushed to keep the rendering hardware busy. Moreover, the system has control over which bins to flush, in which order to flush the bins, and in some scenarios, which portion of the bins to flush. After the selected one or more bins of a frame are preemptively flushed, the unbinned portion of that frame (i.e., the portion of the frame that has not been binned) can continue to be binned and then flushed.

As used herein, a frame is "binned" when it is sorted into bins and stored into a bin buffer. A "bin buffer" is temporary storage for bin data and will be described in detail with reference to FIG. 2. A frame is fully or completely binned when all of its primitives have been sorted into the bins and stored in the bin buffer. Similarly, a primitive is binned when it is sorted into a bin and stored in the bin buffer. A graphical object "touches" or "intercepts" a bin when at least one of its primitives is to be rendered in the bin area corresponding to that bin. The terms "bin" and "bin area" can be used interchangeably to mean a work unit for binning and rendering. The primitives that are sorted into a bin are called the bin data of the bin. The term "flush" or "flushing" refers to moving or loading bin data from a bin buffer into a rendering engine, which enables immediate rendering of the bin data and release of the occupied buffer space for reuse. Moreover, "flushing the bin data of a bin" is used interchangeably with "flushing the bin" or "bin flush."

FIG. 1 illustrates a system 100 that includes a CPU 110 and a GPU 120 according to one embodiment. Although only one CPU and one GPU is shown, it is understood that the system 100 may include any number of CPUs and GPUs, as well as any number of other processors. In one embodiment, the system 100 may be implemented as a system-on-a-chip (SoC) that is used in a computing and/or communication system. Although four cores are shown in this embodiment, each of the CPU 110 and GPU 120 may include any number of cores (cores 115 and 125, respectively) to perform computing tasks. In one embodiment, the CPU 110 and the GPU 120 communicate with a system memory 130 (e.g., dynamic random-access memory (DRAM) or other volatile or non-volatile random-access memory) via a system interconnect 140 and a memory controller 150. It is understood that many other system components are omitted herein for simplicity of illustration.

In one embodiment, the GPU 120 (more specifically, one or more of the GPU cores 125) receives commands and data describing the graphical objects to be rendered. According to the commands and data, the GPU 120 generates a set of primitives to represent the graphical objects. Primitives are a set of the simplest geometric objects that the system 100 can draw and store; e.g., line segments, curves, triangles, polygons, etc. Each primitive is described by one or more vertices, which is a data structure including a set of attributes (e.g., position, movement, lighting, color, etc.). The GPU 120 performs deferred rendering that includes a binning pass and a rendering pass. Each bin contains the bin data that is to be rendered in a corresponding bin area of a display area. For example, if the display area is divided into a grid of 3×3 bins, a total of 9 bins can be set up to accumulate the primitives of one or more frames.

Figure 2:
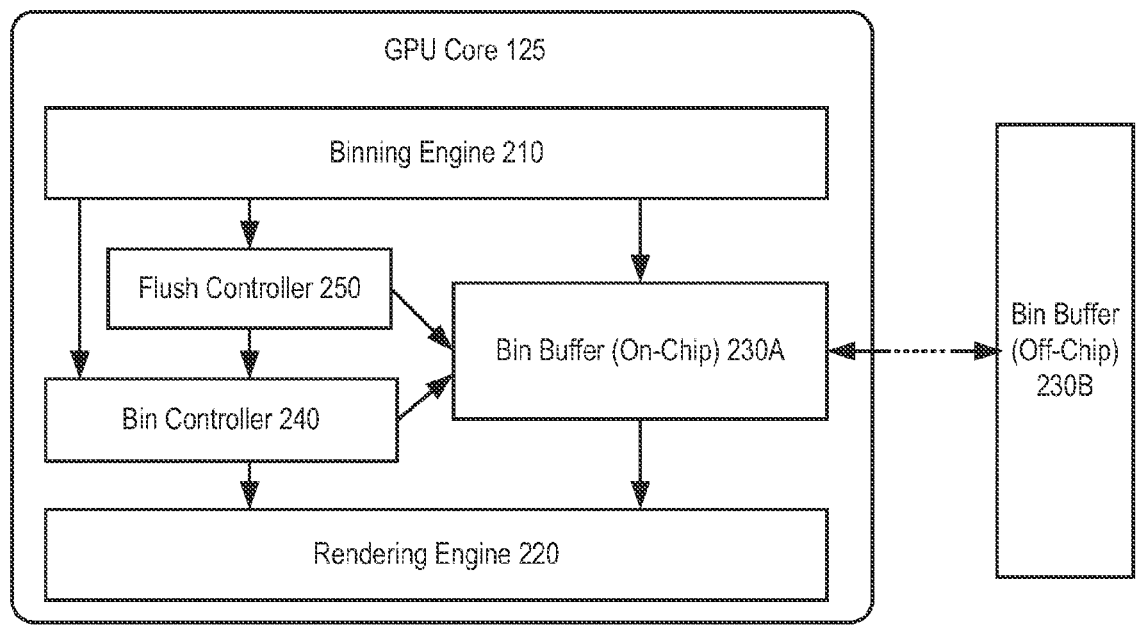
FIG. 2 illustrates a GPU according to one embodiment.

FIG. 2 illustrates an example of the GPU core 125 according to one embodiment. The GPU core 125 includes a binning engine 210 and a rendering engine 220. It is understood that many other GPU components are omitted herein for simplicity of illustration. The GPU core 125 further includes an on-chip component 230A of a bin buffer 230, a bin controller 240 and a flush controller 250. In one embodiment, the bin buffer 230 includes the on-chip component 230A (i.e., located on the same chip as the GPU core 125) and an off-chip component 230B in a designated space of the system memory 130 of FIG. 1. The on-chip component 230A may be implemented by static RAM (SRAM) or other memory elements. The on-chip component 230A and the off-chip component 230B of the bin buffer 230 together hold the bin data. Bin data is stored on-chip temporarily and written to the off-chip component 230B when necessary. Unless otherwise specified, the term "bin buffer 230" herein refers to the on-chip component 230A and the off-chip component 230B collectively.

The components in FIG. 2 (e.g., the binning engine 210, the rendering engine 220, the bin controller 240 and the flush controller 250) may be implemented in hardware, software, firmware, or any combination of the above. Although these components are shown in FIG. 2 as separate functional modules, in some embodiments some or all of these components may share the same hardware, software, firmware, or any combination of the above, to perform some portions of their designated tasks. Moreover, the location of the components in alternative embodiments may differ from what is shown in FIG. 2. For example, although the bin controller 240 and the flush controller 250 in FIG. 2 are shown to be located outside the binning engine 210 and the rendering engine 220, in some embodiments the bin controller 240 and the flush controller 250 may reside wholly or partially within the binning engine 210 and/or the rendering engine 220. In some embodiments, the on-chip component 230A of the bin buffer 230 may be located within the bin controller 240. In some embodiments, some of the components that are shown to be located within the GPU core 125 may be shared by more than one GPU core of the GPU 120.

Figure 3:
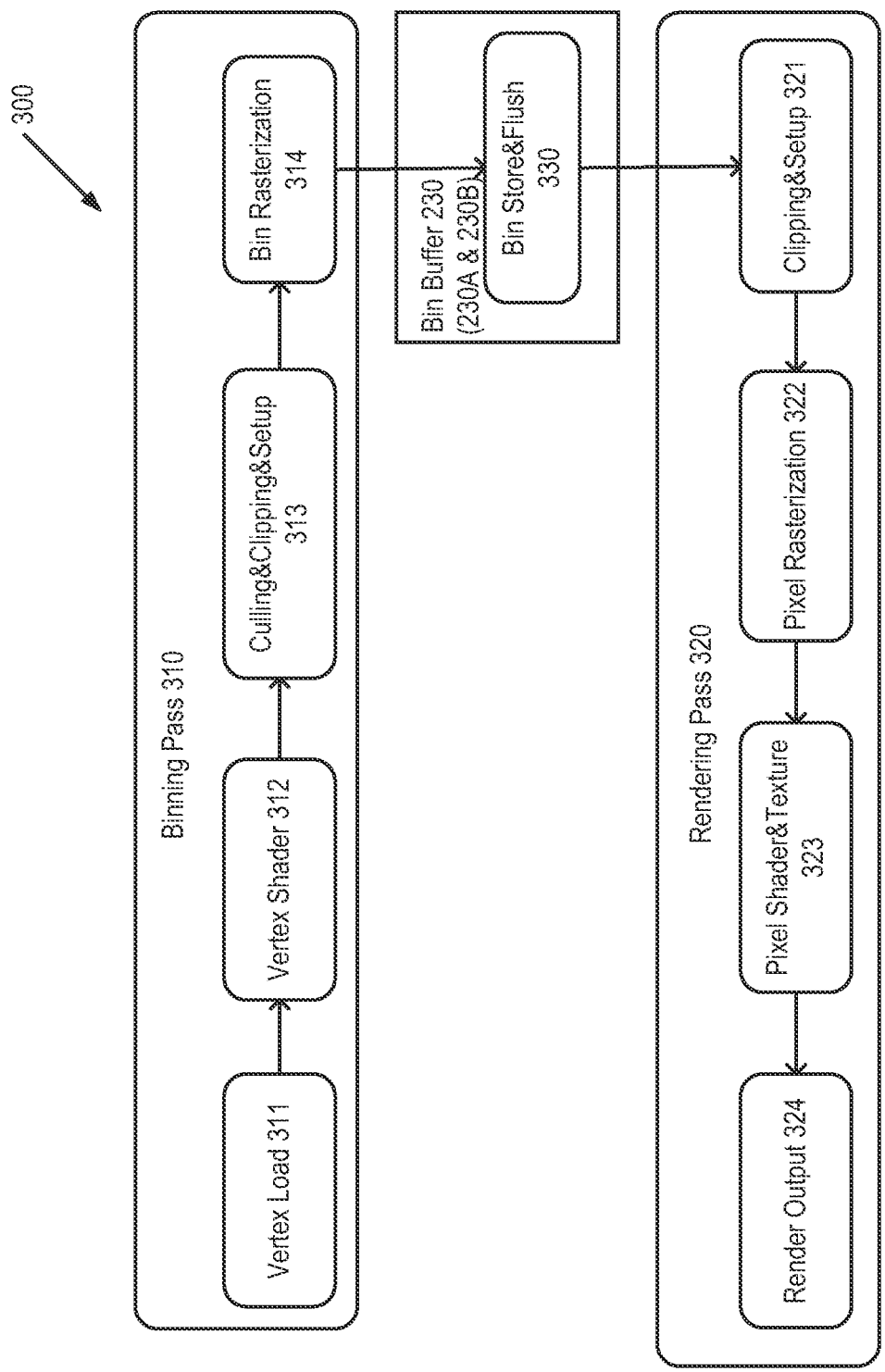
FIG. 3 illustrates a deferred rendering process performed by a GPU according to one embodiment.

FIG. 3 illustrates a deferred rendering process 300 performed by the GPU core 125 (e.g., the GPU core 125 of FIG. 2) according to one embodiment. In this embodiment, the defer rendering process 300 includes a binning pass 310 followed by a rendering pass 320. During the binning pass 310, vertex load 311 loads vertex data and attributes from a vertex load buffer. Vertex representation is commonly used in computer graphics to describe a graphical object. A graphical object is often represented as a set of basic elements called primitives, such as lines, curves, triangles and polygons, etc. Each primitive is formed by one or more vertices and is specified via the vertices. Each vertex is associated with a set of attributes such as the position, color, normal, texture, etc. For each vertex, vertex shader 312 transforms its 3D position into 2D coordinates and a depth value. The vertex shader 312 operation is followed by culling, clipping and setup 313, which remove the primitives not facing the viewer (e.g., a camera) and the primitives outside the field of view from further processing. Bin rasterization 314 associates each primitive with a bin. The resulting bin data is loaded into the bin buffer 230, where bin store and flush 330 take place.

During the rendering pass 320, the data flushed from the bin buffer 230 undergoes further clipping and setup 321. The data is then processed by pixel rasterization 322, pixel shader and texture 323, and the rendering result (e.g., color and Z (depth) values) goes into a render output 324.

It is understood that in alternative embodiments, the binning pass 310 and the rendering pass 320 may include fewer, additional, and/or different operations from what is shown in FIG. 3. Referring also to FIG. 2, in one embodiment, one or more of the operations in the binning pass 310 may be performed by the binning engine 210, and one or more of the operations in the rendering pass 320 may be performed by the rendering engine 220. The bin controller 240 and the flush controller 250 may perform operations for the bin load and flush 330 process. In some embodiments, some of the separate operations in FIG. 3 may be performed by the same hardware. For example, in a GPU that includes a unified shader system, the unified shader system may be programmed to perform the task of vertex shader 312 and pixel shader 323, among other tasks.

Referring again to FIG. 2, for each graphical object in a frame, the binning engine 210 identifies one or more bins that the graphical object touches. The binning engine 210 then associates the primitives generated from the graphical object with the identified one or more bins. The binning engine 210 repeats this binning process for all of the graphical objects in the frame, and then repeats the same process for the next frame.

In one embodiment, the binning engine 210 also performs tessellation on graphical objects. Tessellation is a well known technique that subdivides a surface into a number of smaller adjoined surfaces lying on the plane of and within the boundaries of the original surface. More than one level of tessellation may be performed on a graphical object. In any given frame, one or more graphical objects may be tessellated. As mentioned before, tessellation of a graphical object typically results in a large number of primitives. These primitives can be binned in the same way as the primitives generated from non-tessellated objects.

In one embodiment, the rendering engine 220 performs the rendering pass 320 on bin data to generate a 2D display. The rendering engine 220 loads the bin data from the bin buffer 230, which temporarily stores the bin data generated from the binning engine 210. The access to the bin buffer 230 is controlled by the bin controller 240. The bin controller 240 controls when the binning engine 210 can write bin data into the bin buffer 230, and when the bin data can be flushed into the rendering engine 220. In one embodiment, the bin controller 240 controls the bin buffer 230 access according to a signal sent from the flush controller 250. The flush controller 250 generates such a signal to the bin controller 240 when an adaptive condition is detected. In the following examples, frame N+1 represents the frame undergoing the binning pass, and frame N represents the previous frame to frame N+1.

As a first example, an adaptive condition may be detected when a tessellation object is encountered. The condition is "adaptive" to the tessellation factor, which is an indicator of the number of new primitives generated from the tessellation. If the tessellation factor is small (e.g., the number of new primitives generated from the tessellation is less than a threshold), the flush controller 250 may choose not to perform a preemptive flush. When a preemptive flush is performed, the flush controller 250 may flush only the bins in frame N+1 that the tessellated object touches.

As a second example, if the rendering engine 220 is about to be idle or otherwise under-utilized (e.g., when its utilization, or the number of work cycles per unit time, drops below a threshold), the flush controller 250 may choose to preemptively flush the most heavily-loaded bins in frame N+1. This condition is "adaptive" to the temporal workload imbalance at the rendering engine 250. By flushing the selected bins of the frame, the utilization of the rendering engine 220 can be increased.

As a third example, the flush controller 250 determines whether to preemptively flush frame N+1 based upon a previous frame N. This condition is "adaptive" to the previous frame. The determination is based on a prediction drawn from the similarity of frame N and frame N+1. That is, if frame N and frame N+1 are "similar" and at least a portion of frame N was preemptively flushed, it is predicted that frame N+1 will be preemptively flushed as well. There are a number of similarity metrics for determining the similarity between two frames. As an example, two frames may be considered "similar" according to a similarity metric if both frames contain the same graphical objects with slightly different positions (e.g., when the position difference between the two frames for each graphical object or each of its constituent primitives<threshold). With respect to which bins to flush, if a bin of frame N+1 reaches a primitive count that the same bin of frame N has reached, then that bin can be chosen as the target bin for preemptive flush as the bin is most likely near "mature" for flushing (in other words, most likely no more primitives will intersect the bin again in frame N+1). Moreover, if bins of frame N were preemptively flushed due to the presence of a tessellation object, it can be predicted that the same bins of frame N+1 will also have the same tessellation object and can be preemptively flushed when the tessellation object arrives for binning. This predictive flush avoids re-calculation of the tessellation object's touched areas, as the re-calculation consumes computation resources. Moreover, with this predictive flush, the tessellation object's bin data is directly and immediately flushed when it enters the on-chip component 230A of the bin buffer 230. Thus, there is no need for accumulating the bin data in the on-chip component 230A of the bin buffer 230 and incrementally flushing the bin data, as will be described in more detail below in connection with alternative embodiments.

As additional examples, an adaptive condition may be detected when any of the following occurs: when the total number of primitives in frame N+1 p_total has reached a threshold (e.g., when p_total>p_threshold); when the number of bytes b_total in the bin buffer 230 that are used for storing bin data has reached a threshold (e.g., when b_total>b_threshold); when a graphical object is tessellated and undergoes binning, or when a graphical object that is predicted to generate a massive number of primitives (e.g., when its predicted primitive count>predicted threshold) undergoes binning. That is, the preemptive flush is adaptive to the state and characteristics of frame N+1, frame N, available memory, and/or one or more preset, predicted, historical, comparison, or empirical values that are used to set the relevant threshold values. In one embodiment, the thresholds are determined and set such that the bin data is flushed before the bin buffer 230 is full. In one embodiment, the flush controller 250 uses a primitive counter to count the primitives generated in a frame (p_total), and a monitor logic to monitor memory usage in the bin buffer 230 (b_total).

Continuing with the above examples, the flush controller 250 may also use primitive counters to count the number of primitives in each of the bins. The primitive count value per bin, represented by p_cnt[bin], is useful when determining which bins to flush. For example, a bin is selected for preemptive flush when p_cnt[bin] of the bin reaches a predictive value. For example, a bin is selected for preemptive flush when p_cnt[bin] of the bin reaches a preset value, when p_cnt[bin] of the bin reaches a value predicted from the previous frame (i.e., frame N), or when p_cnt[bin] of the bin is the maximal value among p_cnt[bin] of all bins. When p_cnt[bin] of a bin is the maximal value among p_cnt[bin] of all bins, it means that the bin is most heavily loaded among all bins. In one embodiment, the flush controller 250 may use p_cnt[bin] values to select the top n most heavily loaded bins (i.e., the largest n p_cnt[bin] values) among all bins to flush, where n is a number that can be adaptively determined at runtime.

Figure 4:
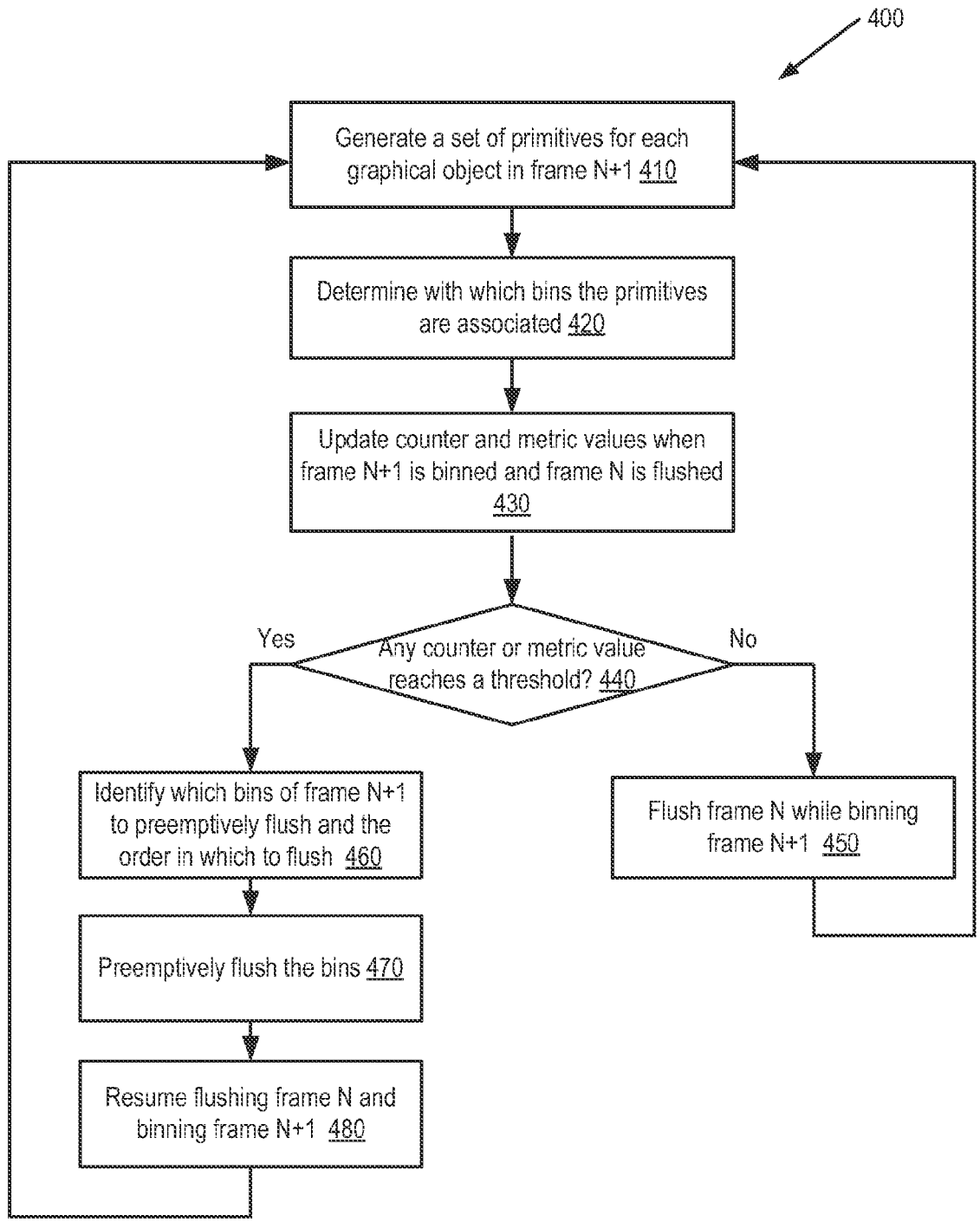
FIG. 4 is a flow diagram illustrating a method for preemptive flush according to one embodiment.

FIG. 4 is a flow diagram illustrating a method 400 for selecting the bins to preemptively flush according to one embodiment. For each graphical object in a frame (e.g., frame N+1), the binning engine 210 generates a set of primitives (block 410) and identifies with which bins these primitives are associated (i.e., which bins the graphical object touches) (block 420). When frame N+1 is being binned into the identified bins, the flush controller 250 updates a set of counters and metrics: e.g., the total primitive count of frame N+1, the number of bytes used in the bin buffer 230, the primitive counts of the identified bins, the tessellation factor of frame N+1, the utilization of rendering hardware, the similarity metrics between the previous frame (i.e., frame N) and frame N+1, etc., and/or any combination of the above (block 430). While frame N+1 is being binned, the flush controller 250 removes (i.e., flushes) the bins of frame N from the bin buffer 230 into the rendering engine 220 for rendering. In one embodiment, the flush controller 250 sends a command signal to trigger the bin controller 240 to flush. To reflect the effect of flushing frame N and to keep track of the system state, the flush controller 250 also updates a set of counters values and metric values: e.g., the total primitive count of frame N, the number of bytes used in the bin buffer 230, the primitive counts of the flushed bins, the utilization of rendering hardware, the bins touched by a tessellate object (if any) in frame N, the similarity metrics, etc. (block 430). The flush controller 250 determines whether any adaptive condition may be present (block 440). For example, the flush controller 250 compares the updated counter and metric values with a set of thresholds to determine whether any of the thresholds is reached or exceeded: e.g., whether p_total>p_threshold, b_total>b_threshold, tessellation factor>t_threshold, rendering utilization<u_threshold, frame similarity>s_threshold, etc (block 440). If none of these counter values reaches or exceeds the respective threshold, frame N is flushed bin by bin while frame N+1 is binned (block 450). If the flush controller 250 detects an adaptive condition, e.g., by comparing any of these counter or metric values with the respective thresholds, the flush controller 250 further determines which bin(s) of frame N+1 should be preemptively flushed, and the order in which these bins are flushed if more than one bin is to be preemptively flushed (block 460). In one scenario, the flush controller 250 uses the primitive counter values p_cnt[bin] to determine the bins to be preemptively flushed, and the order of bin flush. The flush controller 250 then sends a signal to the bin controller 240 to indicate which bins of frame N+1 should be flushed in which order to start preemptive flushing of frame N+1 (block 470). During the preemptive flush, the flushing of frame N and the binning of frame N+1 are paused. After the preemptive flush, the bin controller 240 resumes flushing of frame N and the binning engine 210 resumes binning of frame N+1 (block 480).

In one embodiment, the flush controller 250 uses information sent from the binning engine 210 to determine whether to signal a flush. For example, the binning engine 210 may indicate to the flush controller 250 that a graphical object is being tessellated. The binning engine 210 may also indicate to the flush controller 250 that a graphical object having a massive number of primitives (e.g., when the number of primitives reaches a threshold) is being binned. The primitives generated from a tessellated or otherwise complex graphical object can be so large in number that the on-chip component 230A of the bin buffer 230 may not have sufficient capacity to store all of its primitives. To increase bin data access speed, in one embodiment, the binning and flushing of a tessellated (or otherwise complex) graphical object can be performed incrementally in multiple iterations. During each iteration, a portion of the bin data (also referred to as partial bin data) generated from the graphical object is loaded into the on-chip component 230A of the bin buffer 230. Then a preemptive flush is triggered to flush the partial bin data. The iterations repeat until all of the bin data of the graphical object are binned and completely flushed. The size of the partial bin data loaded and flushed in each iteration is determined such that the on-chip component 230A of the bin buffer 230 does not overflow. Thus, the bin data of the graphical object will not go to the off-chip component 230B of the bin buffer 230 before rendering. As a result, system performance such as efficiency is enhanced in such scenarios as all of the bin data can fit into the on-chip component 230A of the bin buffer 230.

Figure 5A:
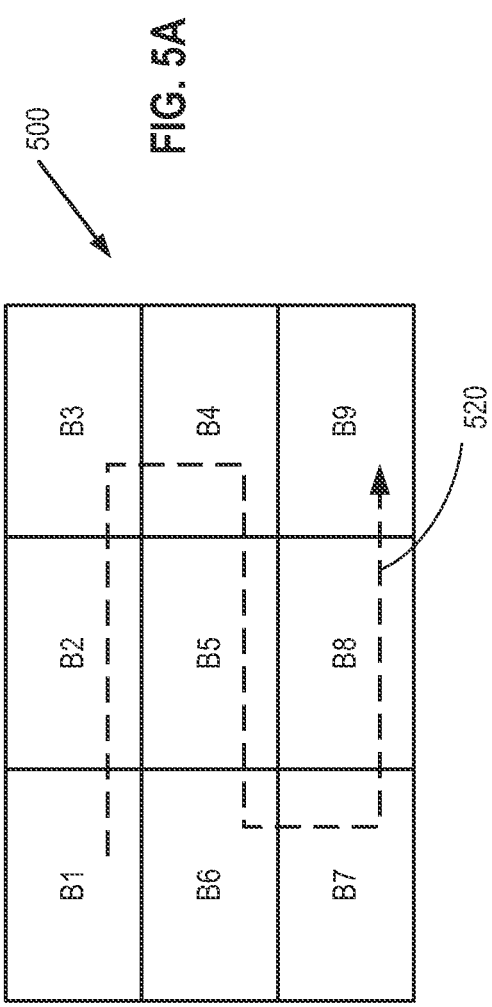
FIG. 5A illustrates a display area divided into bins according to one embodiment.

FIG. 5A illustrates an example of a display area 500 segmented or divided into a grid of 3×3 bin according to one embodiment. In alternative embodiments the display area 500 may be segmented into any number of bins (e.g., hundreds or thousands), limited by the resolution of the display device. The display area 500 is where each frame of a frame sequence is rendered and displayed. In this example, the bins are represented by B1, B2, B3 . . . , and B9. An arrow 520 shows the normal order of bin flush (e.g., in the order of B1, B2, B3, . . . , B9) from the bin buffer 230. A frame is flushed according to this "normal" order when none of its bins are preemptively flushed. A different sequence may be used in an alternative embodiment.

Figure 5B:
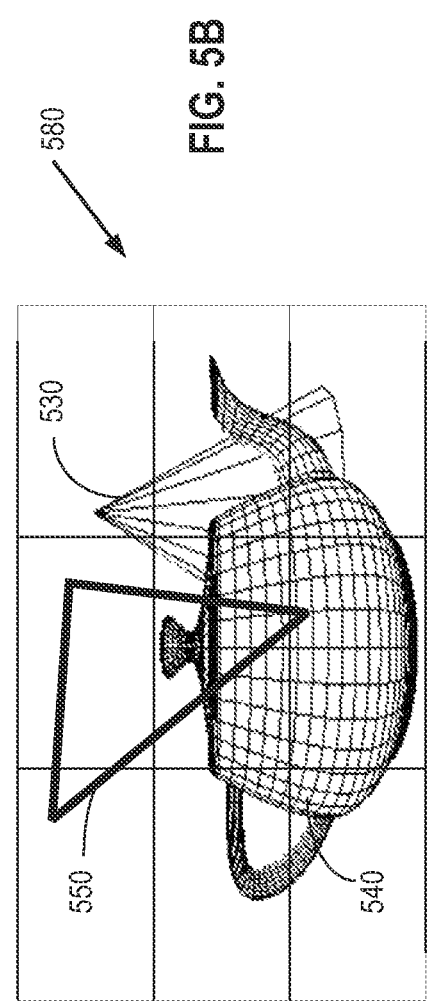
FIG. 5B illustrates a frame containing multiple graphical objects according to one embodiment.

FIG. 5B illustrates an example of a frame 580 to be rendered according to one embodiment. In this example, the frame 580 includes three graphical objects: a cone 530 in the background, a teapot 540 in the midground and a triangle 550 in the foreground. The teapot 540 is tessellated while the cone 530 and the triangle 550 are not tessellated. Suppose that the binning engine 210 receives the three overlapping graphical objects in the order of the cone 530, the teapot 540 and the triangle 550. The bin data for each of the three graphical objects is generated in the same order of the cone 530, the teapot 540 and the triangle 550. In this example, after the cone 530 is fully binned, the teapot 540 is tessellated and also binned into Bins 4-9 (i.e., B4, B5, B6, B7, B8 and B9). When the teapot 540 is wholly or partially tessellated and binned, an adaptive condition is detected by the flush controller 250. As a result, Bins 4-9 of the frame 580, which are the bins touched by the teapot 540, are preemptively flushed before the frame 580 is fully binned. In one scenario, the portion of the cone 530 that falls into Bins 4-9 is also preemptively flushed with the teapot 540. For each flushed bin, bin data generated from the cone 530 may be flushed first, followed by the teapot 540. The preemptive flush interrupts the flush process of the previous frame. After the preemptive flush, the binning engine 210 continues to bin the unbinned portion of the teapot 540 (if there is any) and the triangle 550, while the previous frame resuming its flush process. In an alternative scenario, the flush controller 250 may select which portion of bin data in Bins 4-9 to flush; for example, the bin data of the teapot 540 may be flushed alone without the cone 530 being flushed.

Figure 6A:
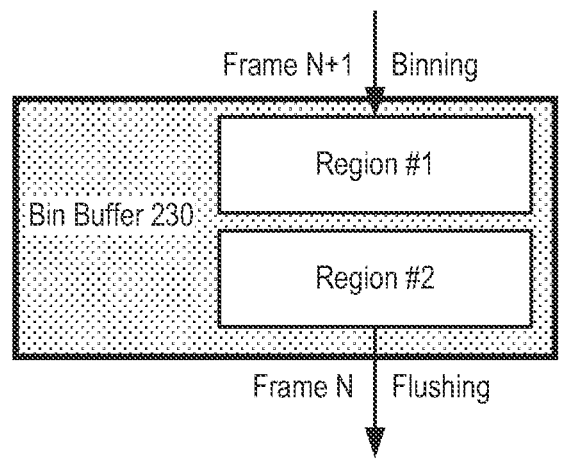
FIGS. 6A-6D illustrate a process in which preemptive flushing of a frame interrupts the normal flushing of another frame according to one embodiment.

FIGS. 6A-6D illustrate a process of preemptive flush of a frame (e.g., frame N+1), which interrupts the normal flush process of another frame (e.g., frame N, which is the previous frame) according to one embodiment. FIG. 6A illustrates an example of the bin buffer 230 that supports ping-pong data access. In this example, the bin buffer 230 includes two regions: region #1 and region #2. The primitives of frame N+1 are being loaded into region #1. The primitives of frame N, which have already been loaded into region #2, are being flushed from the bin buffer 230 to start the rendering process.

Figure 6B:
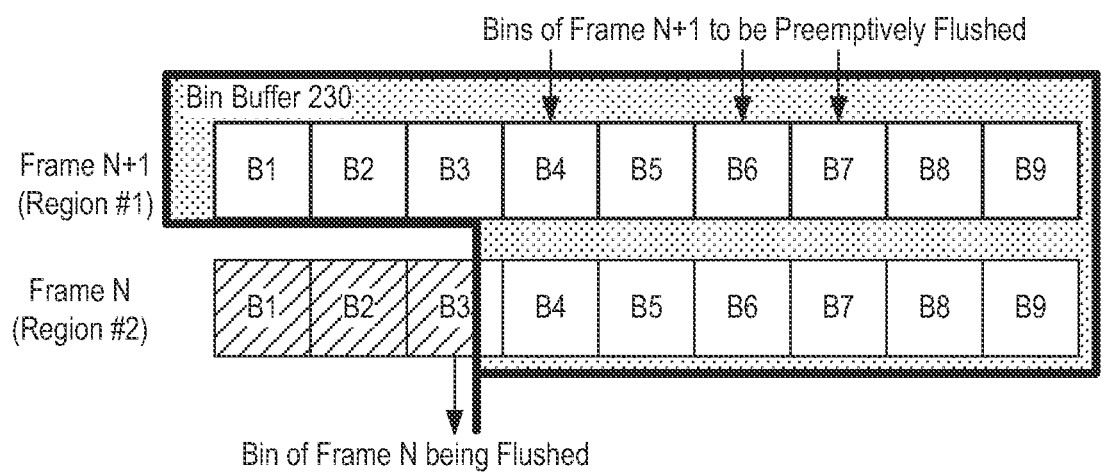
Figure 6C:
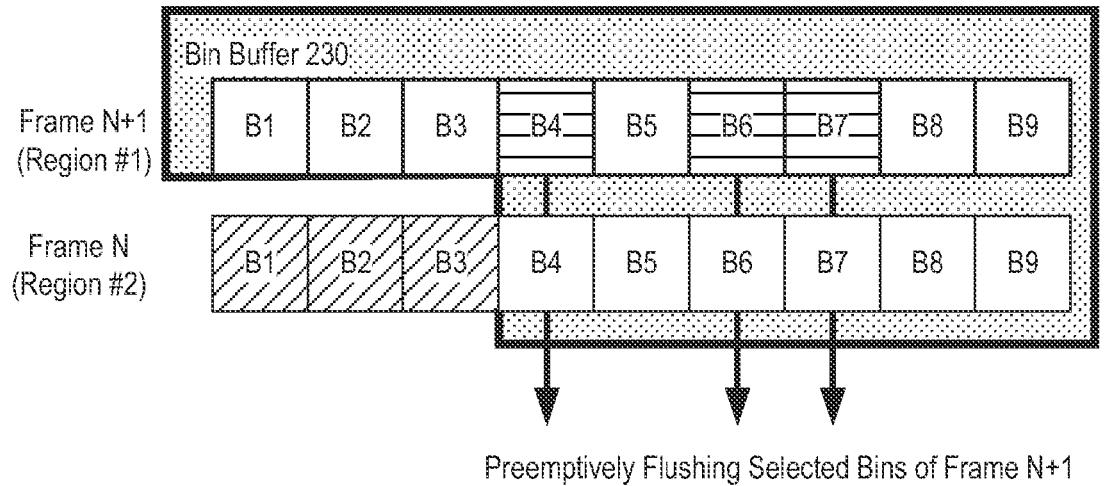
Figure 6D:
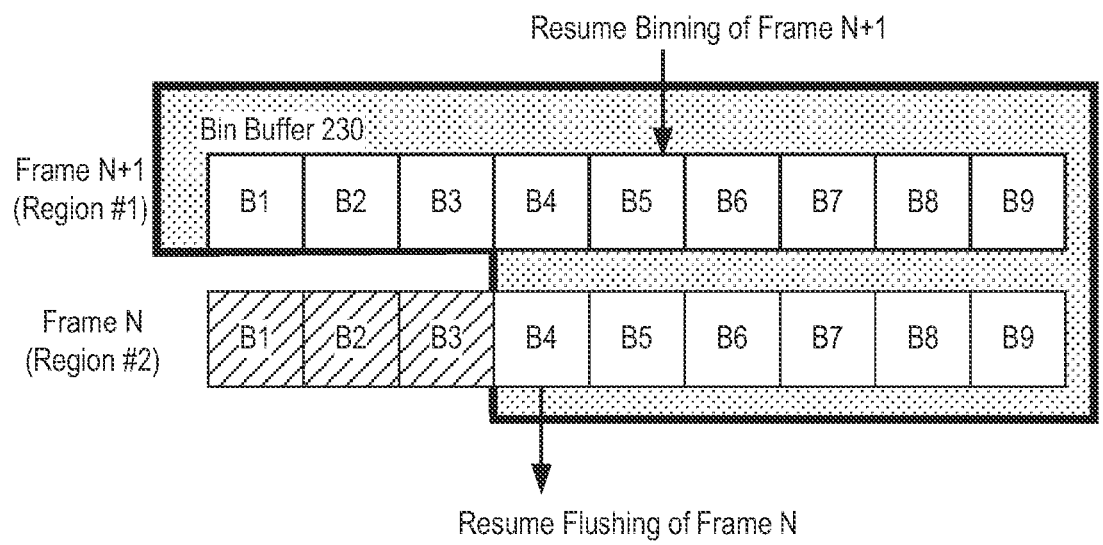

Referring to FIG. 6B, suppose that frame N is being flushed, bin by bin, from region #2 according to the normal order shown in the example of FIG. 5A. While frame N is being flushed, frame N+1 is being loaded to region #1. The portion of frame N+1 that has already been flushed from the bin buffer 230 is indicated by a slanted hatched-line pattern. In this example, after B1 and B2 of frame N have been flushed and when B3 of frame N is partially flushed, an adaptive condition occurs and is detected by the flush controller 250. The flush controller 250 sends a signal to the bin controller 240 to interrupt the flushing of frame N. The signal indicates that the selected bins (e.g., B6, B7 and B4) of frame N+1 are to be flushed in that order. Referring to FIG. 6C, upon receiving the signal, the bin controller 240 first completes flushing of the current bin (i.e., B3 of frame N), pauses further flushing of frame N, and then switches to flush B6, B7 and B4 of frame N+1. In FIG. 6C, B6, B7 and B4 of frame N+1 are shown in horizontal lines to indicate that they are in the process of preemptive flush. Referring to FIG. 6D, after B6, B7 and B4 of frame N+1 are flushed, the bin controller 240 resumes to flush the remaining bins of frame N (i.e., B4-B9 of frame N) from region #2 while the binning engine 210 continues to bin the unbinned portion of frame N+1 into region #1.

It is noted that the bins of frame N+1 can be flushed in any order as determined by the flush controller 250. The bin flush can be prioritized based on one or more scenarios or parameters; e.g., the primitive count of each bin (i.e., p_cnt[bin]). For example, if p_cnt[B6]>p_cnt[B7]>p_cnt[B4], then the bins can be flushed in the order of B6, B7 and B4. Thus, in this example, B6, B7 and B4 of frame N+1 are to be flushed in the order as described, even though normally the bins are flushed in a different order (e.g., B1, B2, . . . , B9 as shown in the example of FIG. 5A). Thus, in the example of FIGS. 6A-6D, the selected bins of frame N+1 during the preemptive flush are flushed in a different order from the order in which the bins of frame N are flushed.

It is also noted that the bin flush of frame N can be interrupted by the preemptive flush of frame N+1 more than one time if adaptive conditions occur more than once during the bin flush. After frame N is completely flushed and frame N+1 is completely binned, frame N+1 can be flushed in the normal order, and the bin flush of frame N+1 may also be interrupted by a next frame (e.g., frame N+2) any number of times.

Figure 7:
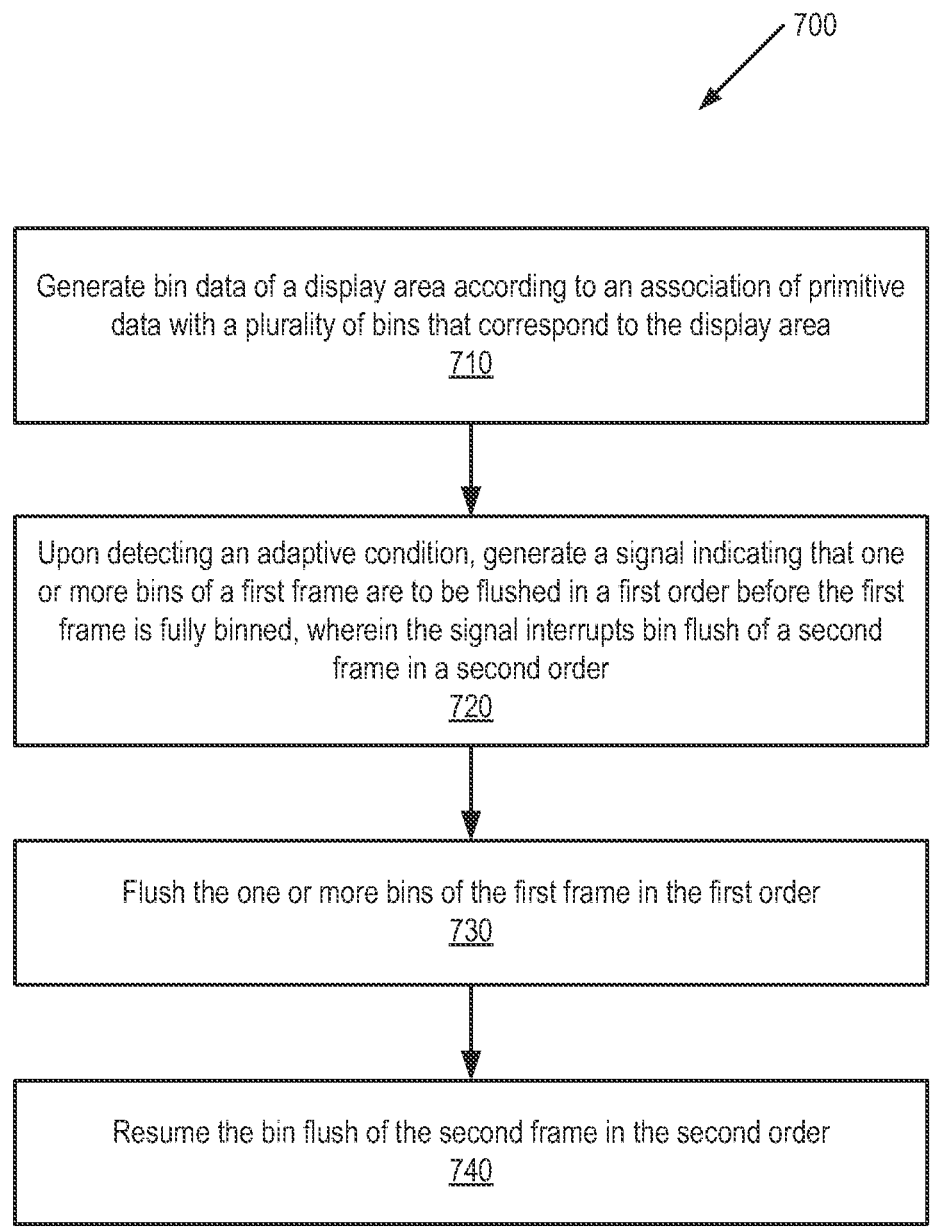
FIG. 7 is a flow diagram illustrating a method for preemptive flushing of spatial selective bins according to one embodiment.

FIG. 7 is a flow diagram illustrating a method 700 for preemptive flushing of spatial selective bins according to one embodiment. Referring to FIG. 2 and FIG. 7, in one embodiment, the method 700 begins when a GPU (e.g., the GPU core 125 of FIG. 2) generates bin data of a display area according to an association of primitive data with a plurality of bins that correspond to the display area (block 710). The GPU generates, upon detecting an adaptive condition, a signal indicating that one or more bins of a first frame are to be flushed in a first order before the first frame is fully binned. The signal interrupts bin flush of a second frame in a second order (block 720) to flush the one or more bins of the first frame in the first order (block 730). After the one or more bins of the first frame are flushed, the bin flush of the second frame is resumed in the second order (block 740).

The method 700 is spatially selective in that it enables a subset of bins in a frame to be flushed, where the subset of bins corresponds to a portion of a display area. The subset of bins may hold the bin data generated from graphical objects having complex features (e.g., having a large number of primitives). Thus, those bin in which complex features are to be rendered and displayed are given priority to start rendering. The preemptive flushing of the subset of bins prevents these bins from being overly heavily-loaded with bin data.

Moreover, a complex graphical object typically takes much longer time to bin than a simple graphical object. As a result, the rendering pass may be stalled while waiting for the binning pass to generate output for a complex graphical object. Preemptive flush, as described herein, prevents or alleviates the stalling of the rendering pass. With preemptive flush, the binning pass can output data earlier (than without the preemptive flush) to feed the bin data into the rendering pass. This allows the rendering pass to start its work earlier. Therefore, with preemptive flush, the total executive time for the binning pass and the rendering pass is reduced, and the GPU performance can be improved.

The method 700 may be performed by hardware (e.g., circuitry, dedicated logic, programmable logic, microcode, etc.), software (e.g., instructions run on a processing device), or a combination thereof. In one embodiment, the method 700 is performed by the GPU 120 of FIG. 1 (or more specifically, the GPU core 125 of FIGS. 1 and 2). In one embodiment, the GPU 120 may be part of a mobile computing and/or communication device (e.g., a smartphone, a tablet, laptop, etc.). In one embodiment, the GPU 120 may be part of a server system or a cloud computing system.

The operations of the flow diagrams of FIGS. 4 and 7 have been described with reference to the exemplary embodiment of FIGS. 1 and 2. However, it should be understood that the operations of the flow diagrams of FIGS. 4 and 7 can be performed by embodiments of the invention other than those discussed with reference to FIGS. 1 and 2, and the embodiments discussed with reference to FIGS. 1 and 2 can perform operations different than those discussed with reference to the flow diagrams. While the flow diagrams of FIGS. 4 and 7 shows a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A graphics processing unit (GPU) comprising:
   a binning engine to generate bin data of a display area according to an association of primitive data with a plurality of bins that correspond to the display area;
   a rendering engine to render the bin data of the display area;
   a flush controller to generate, upon detecting an adaptive condition, a signal before a first frame is fully binned in a bin buffer and after a second frame is binned in the bin buffer, wherein the second frame reaches the bin buffer prior to the first frame; and
   a bin controller coupled to the binning engine, the rendering engine and the flush controller, the bin controller operative to control access to the bin buffer and bin flush on a bin-by-bin basis from the bin buffer to the rendering engine,
   wherein the bin controller is further operative to: in response to the signal, pause the bin flush of the second frame in a second order to perform the bin flush of one or more bins of the first frame in a first order; and resume the bin flush of the second frame in the second order after completion of the bin flush of the one or more bins of the first frame.

2. The GPU of claim 1, wherein the flush controller is further operative to count a total number of primitives in the first frame, and detects the adaptive condition when the total number reaches a first threshold.

3. The GPU of claim 1, wherein the flush controller is further operative to monitor memory usage in the bin buffer, and detects the adaptive condition when the memory usage reaches a second threshold.

4. The GPU of claim 1, wherein the flush controller is further operative to generate a primitive count associated with each bin in the first frame, and generate the signal to flush a bin upon detecting the adaptive condition when the primitive count of the bin reaches one of a preset value, a value predicted from a previous frame, and a maximum value among primitive counts of all of the bins.

5. The GPU of claim 1, wherein the flush controller is operative to detect the adaptive condition when a tessellated object in the first frame generates a primitive count greater than a threshold.

6. The GPU of claim 1, wherein the flush controller is operative to detect the adaptive condition when utilization of the rendering engine is below a threshold.

7. The GPU of claim 1, wherein the flush controller is operative to detect the adaptive condition when a similarity metric between the first frame and the second frame is within a threshold and at least a portion of the second frame was preemptively flushed.

8. The GPU of claim 7, wherein the flush controller is operative to cause a set of bins in the first frame to be flushed when a tessellated object arrives for binning, wherein the set of bins were touched by the tessellated object in the second frame.

9. The GPU of claim 1, wherein the bin controller is further operative to flush the one or more bins to remove bin data generated from a graphical object in multiple iterations, and wherein during each of the multiple iterations a portion of the bin data is generated from the graphical object and flushed such that an on-chip component of the bin buffer has sufficient capacity to store the bin data throughout the multiple iterations until the graphical object is completely flushed.

10. The GPU of claim 1, wherein the binning engine is further operative to resume binning an unbinned portion of the first frame while the bin controller resumes flushing the second frame.

11. A method of a graphics processing unit (GPU) comprising:
    generating bin data of a display area according to an association of primitive data with a plurality of bins that correspond to the display area;
    generating, upon detecting an adaptive condition, a signal before the before a first frame is fully binned in a bin buffer and after a second frame is binned in the bin buffer, wherein the second frame reaches the bin buffer prior to the first frame;
    in response to the signal, pause bin flush of the second frame in a second order to perform the bin flush of one or more bins of the first frame in a first order, wherein the bin flush is performed on a bin-by-bin basis from the bin buffer to rendering hardware; and
    resuming the bin flush of the second frame in the second order after completion of the bin flush of the one or more bins of the first frame.

12. The method of claim 11, further comprising:
    counting a total number of primitives in the first frame; and
    detecting the adaptive condition when the total number reaches a first threshold.

13. The method of claim 11, further comprising:
    monitoring memory usage in the bin buffer; and
    detecting the adaptive condition when the memory usage reaches a second threshold.

14. The method of claim 11, further comprising:
    generating a primitive count associated with each bin in the first frame; and
    detecting the adaptive condition for generating the signal to flush a bin when the primitive count of the bin reaches one of a preset value, a value predicted from a previous frame, and a maximum value among primitive counts of all of the bins.

15. The method of claim 11, wherein generating the signal further comprises:
    detecting the adaptive condition when a tessellated object in the first frame generates a primitive count greater than a threshold.

16. The method of claim 11, wherein generating the signal further comprises:
  detecting the adaptive condition when utilization of the rendering hardware is below a threshold.

17. The method of claim 11, wherein generating the signal further comprises:
  detecting the adaptive condition when a similarity metric between the first frame and the second frame is within a threshold and at least a portion of the second frame was preemptively flushed.

18. The method of claim 11, wherein flushing the one or more bins of the first frame further comprises:
  flushing a set of bins in the first frame when a tessellated object arrives for binning, wherein the set of bins were touched by the tessellated object in the second frame.

19. The method of claim 11, further comprising:
  flushing the one or more bins to remove bin data generated from a graphical object in multiple iterations, wherein during each of the multiple iterations a portion of the bin data is generated from the graphical object and flushed such that an on-chip component of the bin buffer has sufficient capacity to store the bin data throughout the multiple iterations until the graphical object is completely flushed.

20. The method of claim 11, further comprising:
  resuming binning an unbinned portion of the first frame while resuming flushing the second frame.

* * * * *